(12) United States Patent
Case

(10) Patent No.: US 8,670,644 B2
(45) Date of Patent: Mar. 11, 2014

(54) MANIFOLD FOR MANAGING FIBER OPTIC CABLE AND STRUCTURES AND SYSTEMS THEREFOR

(75) Inventor: Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 399 days.

(21) Appl. No.: 12/952,543

(22) Filed: Nov. 23, 2010

(65) Prior Publication Data

US 2012/0128308 A1    May 24, 2012

(51) Int. Cl.
*G02B 6/00* (2006.01)

(52) U.S. Cl.
USPC ............................................ 385/135

(58) Field of Classification Search
USPC .................................. 385/134–137
See application file for complete search history.

(56) References Cited

U.S. PATENT DOCUMENTS

| | | | | |
|---|---|---|---|---|
| 4,995,728 A | * | 2/1991 | Finzel ............................. | 385/95 |
| 5,497,444 A | * | 3/1996 | Wheeler ........................ | 385/135 |
| 5,717,812 A | * | 2/1998 | vandenEnden et al. ....... | 385/135 |
| 5,724,467 A | * | 3/1998 | vandenEnden et al. ....... | 385/134 |
| 5,758,003 A | * | 5/1998 | Wheeler et al. ............... | 385/134 |
| 7,054,163 B2 | * | 5/2006 | Coffey .......................... | 361/796 |
| 7,113,687 B2 | * | 9/2006 | Womack et al. .............. | 385/135 |
| 7,627,221 B2 | * | 12/2009 | Morris .......................... | 385/135 |
| 7,999,183 B2 | * | 8/2011 | Garza et al. ................... | 174/100 |
| 8,270,796 B2 | * | 9/2012 | Nhep ............................ | 385/135 |

OTHER PUBLICATIONS

Corning LANscape® Pretium® Solutions; "Pretium EDGE™ Solutions Trunk Cables", Specification Sheet LAN-1141-EN/p. 8 (2009).
Corning LANscape® Pretium® Solutions; "Pretium EDGE™ Solutions Extender Trunks"; Specification Sheet LAN-1141-EN/p. 7 (2009).

* cited by examiner

*Primary Examiner* — Daniel Petkovsek
(74) *Attorney, Agent, or Firm* — Myers Bigel Sibley & Sajovec, P.A.

(57) ABSTRACT

A manifold for managing fiber optic cables includes: a main panel; a plurality of clip channels mounted to a first side of the main panel, each of the clip channels comprising a pair of opposed clip arms sized and configured to receive and secure a fiber optic cable transition; and a pair of snap latches mounted to a second side of the main panel opposite the first side, the snap latches configured to receive cable management fingers. A manifold of this configuration can be particularly useful in organizing and managing fiber optic cables.

6 Claims, 11 Drawing Sheets

MANIFOLD FOR MANAGING FIBER OPTIC CABLE AND STRUCTURES AND SYSTEMS THEREFOR

FIELD OF THE INVENTION

The present invention relates generally to communications equipment and more particularly to high-density fiber distribution apparatus.

BACKGROUND

In the communications industry, the use of fiber optic cables for carrying transmission signals is rapidly growing. To interconnect fiber optic equipment, fiber distribution frames and racks have been developed. Such frames and racks are typically located in a communications closet, data room, or the like, where technicians can easily connect and reconnect, or "patch," equipment in an organized and efficient manner. These frames and racks are also used in data centers. Examples of fiber distribution frames and racks are shown in U.S. Pat. Nos. 5,497,444 and 5,758,003, which are hereby incorporated by reference.

With the increase in use of fiber optic cables in the telecommunications industry, it is desirable to provide fiber distribution frames/racks with increased density. "Density" refers to the number of locations, or ports, per unit volume or unit area for providing connections within the rack; thus, increased density can provide more connection/patching sites per rack. Many racks are configured to include multiple shelves or trays of a specific size (a standard height of 1.75 inches is known in the industry as a "U"); the size of a rack may be described in terms of "U" (e.g., a "6 U" rack), and the shelves and trays may be described by the number of connections per "U" (e.g., 48 connections/U).

The space constraints associated with high-density distribution frames can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices.

One example of a device with a cable management issue is illustrated in FIGS. 1-4. A director 20 includes a plurality of cards 22 with duplex LC terminations (FIG. 1). The terminations 22 receive duplex LC connectors 24 from an arrayed fiber optic cable 26 (FIGS. 2 and 3). The twelve individual fibers 28 that serve the connectors 24 are broken out from the cable 26 at a transition 30, which is typically a sleeve that fits around the cable 26. If the cards 22 are 96 LC fiber cards, eight different fanouts would be needed to fully populate each card 22; for a typical eight-card director, 64 fan-outs would be present. Locating all of those fan-outs in an organized manner can be challenging. Proposed solutions include a cable trough 32, as shown in FIG. 4, and planar arrays of cable management fingers 40, as shown in FIG. 4A.

SUMMARY

As a first aspect, embodiments of the present invention are directed to a manifold for managing fiber optic cables. The manifold comprises: a main panel; a plurality of clip channels mounted to a first side of the main panel, each of the clip channels comprising a pair of opposed clip arms sized and configured to receive and secure a fiber optic cable transition; and a pair of snap latches mounted to a second side of the main panel opposite the first side, the snap latches configured to receive cable management fingers. A manifold of this configuration can be particularly useful in organizing and managing fiber optic cables.

As a second aspect, embodiments of the present invention are directed to a datacommunications structure, comprising: a mounting frame; cable management fingers arranged in one or more planar arrays; and a cable transition management manifold attached to the cable management fingers. The cable transition management manifold comprises: a main panel; mounting features attached to the main panel to mount the manifold onto the cable management fingers; and clips mounted to the main panel configured to receive and secure a fiber optic cable transition.

As a third aspect, embodiments of the present invention are directed to a datacommunications structure, comprising: a mounting frame; cable management fingers arranged in one or more planar arrays; and a cable transition management manifold attached to the cable management fingers. The cable transition management manifold comprises: a main panel; a plurality of clip channels mounted to a first side of the main panel, each of the clip channels comprising a pair of opposed clip arms sized and configured to receive and secure a fiber optic cable transition; and a pair of snap latches mounted to a second side of the main panel opposite the first side, wherein the snap latches receive the cable management fingers.

As a fourth aspect, embodiments of the present invention are directed to a data communications system, comprising: a mounting frame; cable management fingers arranged in one or more planar arrays; and a cable transition management manifold attached to the cable management fingers. The cable transition management manifold comprises: a main panel; mounting features attached to the main panel to mount the manifold onto the cable management fingers; and clips mounted to the main panel configured to receive and secure a fiber optic cable transition. The system further comprises a fiber optic cable having a plurality of optical fibers and a transition wherein the optical fibers are broken out from each other. The transition of the fiber optic cable is mounted in one of the clips on the cable transition management manifold.

DETAILED DESCRIPTION

Figure 1:
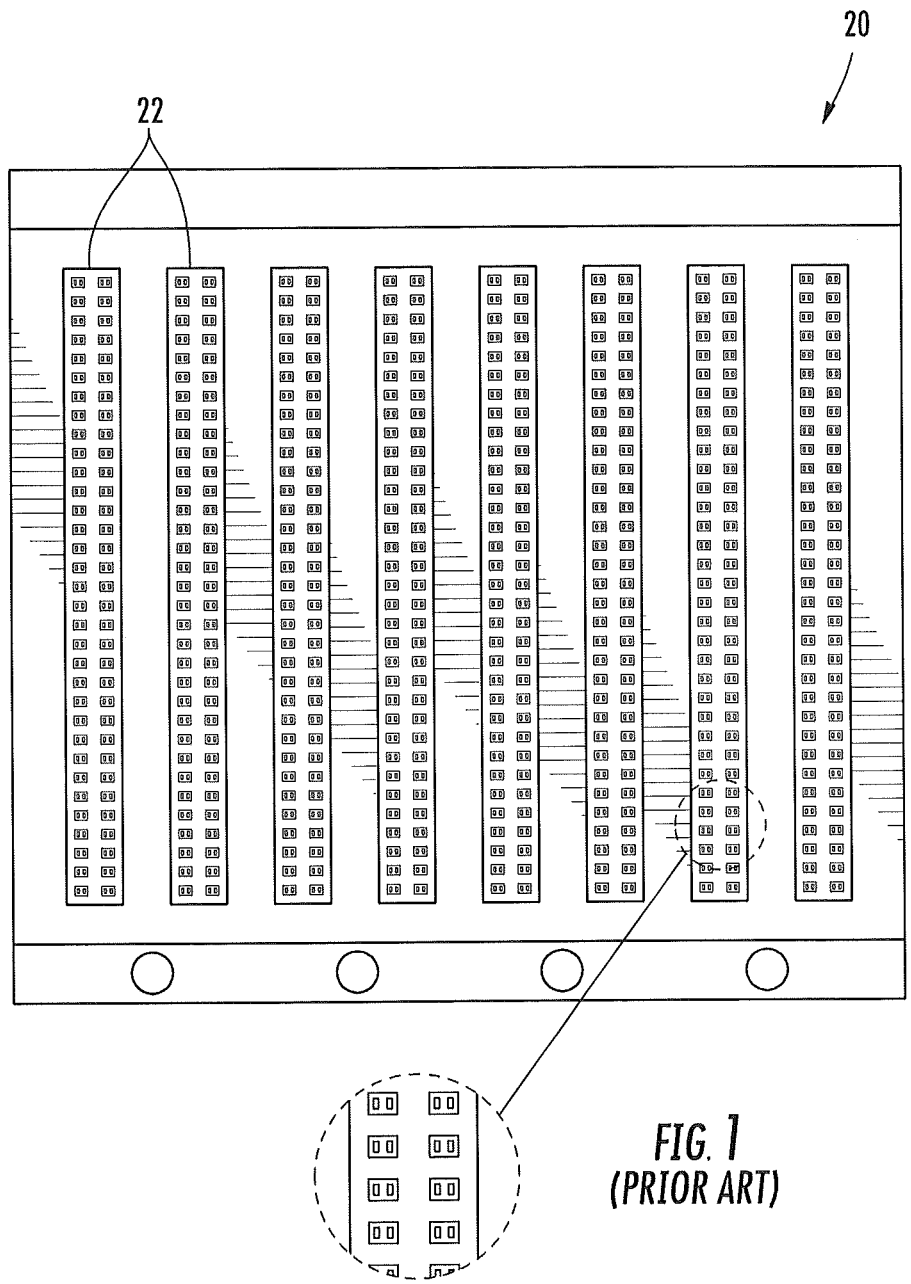
FIG. 1 is a front view of a prior art datacommunications director with a plurality of cards having duplex terminations.
Figure 2:
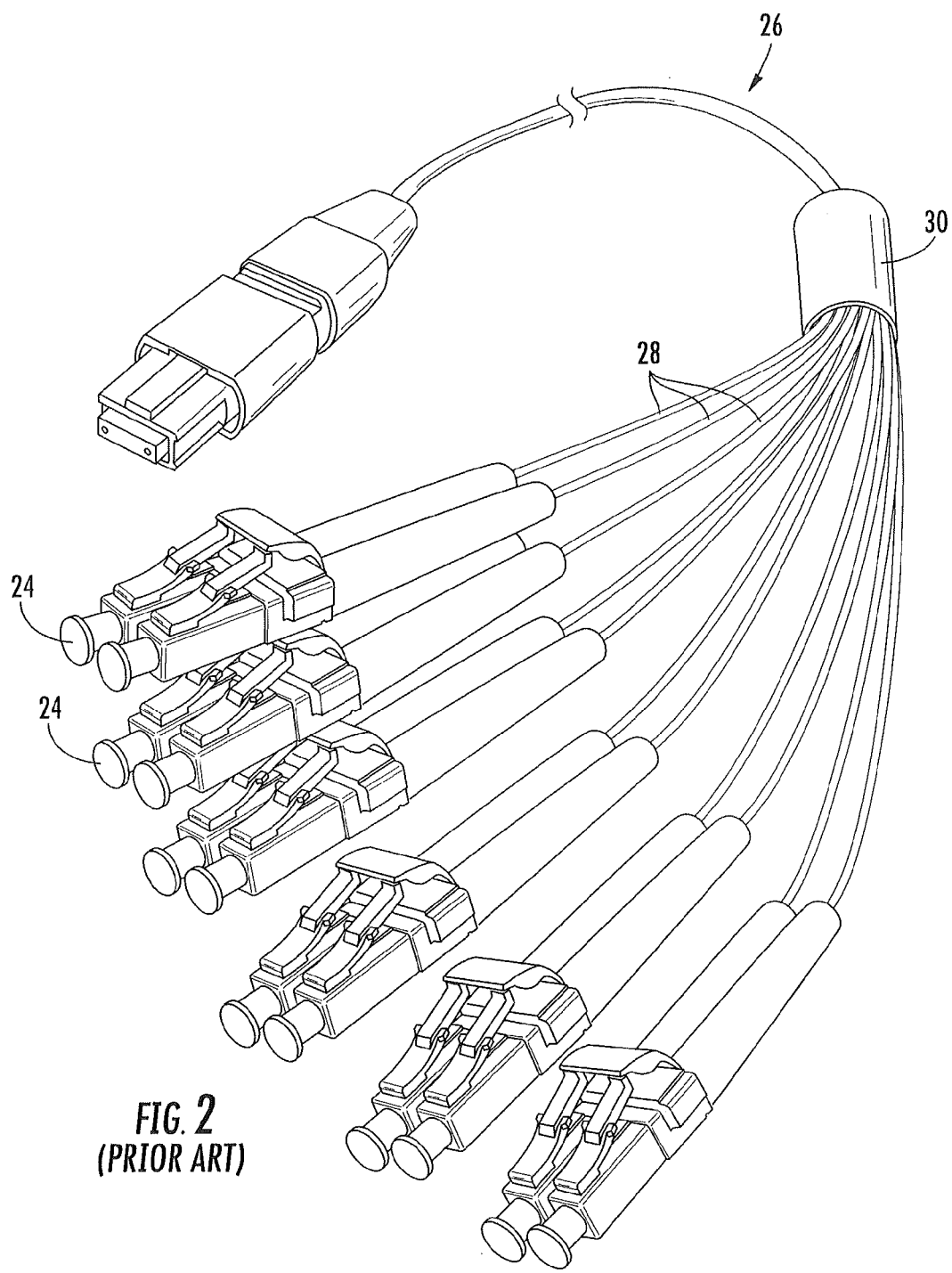
FIG. 2 is a schematic view of a typical fiber optic cable with an MPO connector on one end and duplex LC connectors on the other end, with an intermediate transition where the cable breaks out into fibers.
Figure 3:
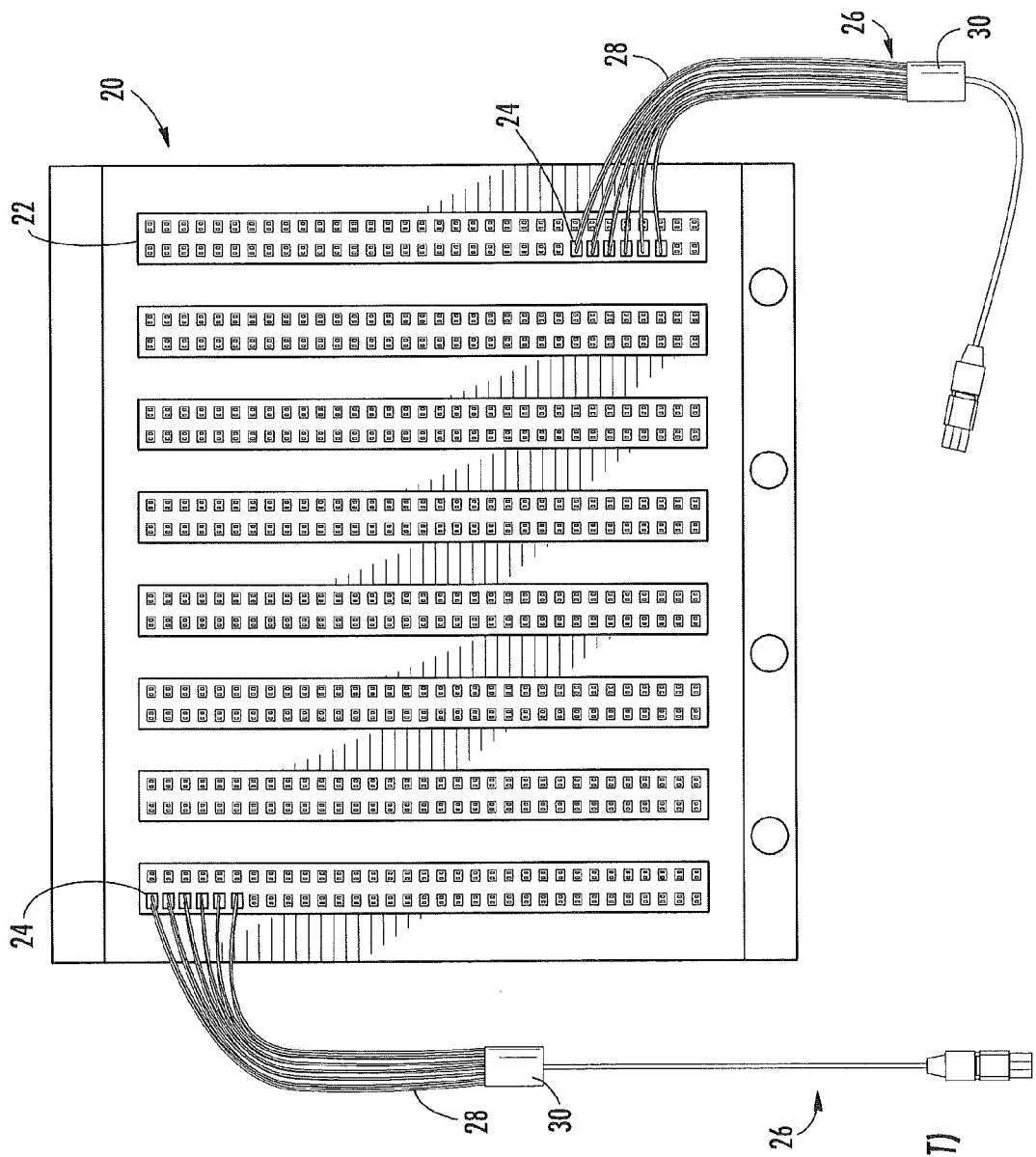
FIG. 3 is a front view of the director of FIG. 1 with two fiber optic cables of FIG. 2 inserted into the cards of the director.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein. "vertical" has the conventional meaning, i.e., upright; or at a right angle to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "connector" is intended to encompass communications connectors and devices employed to facilitate the interconnection of communications cords and cables for the transmission of signals therebetween. A connector may include a termination device at the end of a cord or cable, an adapter that facilitates the interconnection of two termination devices (as may be employed in the interconnection of fiber optic cords and cables, particularly within a connector block), a jack, plug, or the like typically employed with copper cables and cords, or other devices that provide a location or site for the interconnection of cables and cords.

Figure 4:
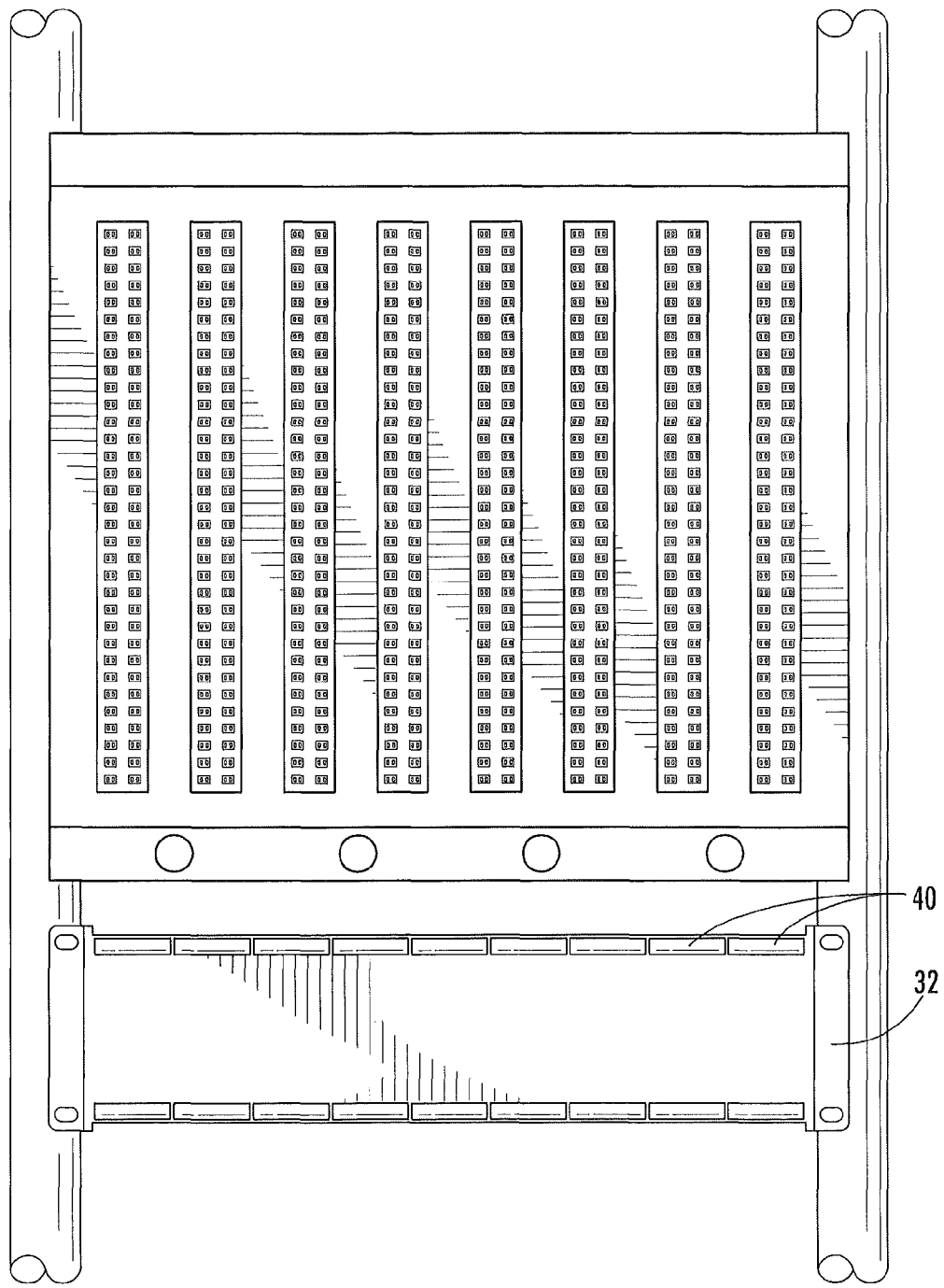
FIG. 4 is a front view of the director of FIG. 1 with a horizontal trough for receiving cables.
Figure 4A:
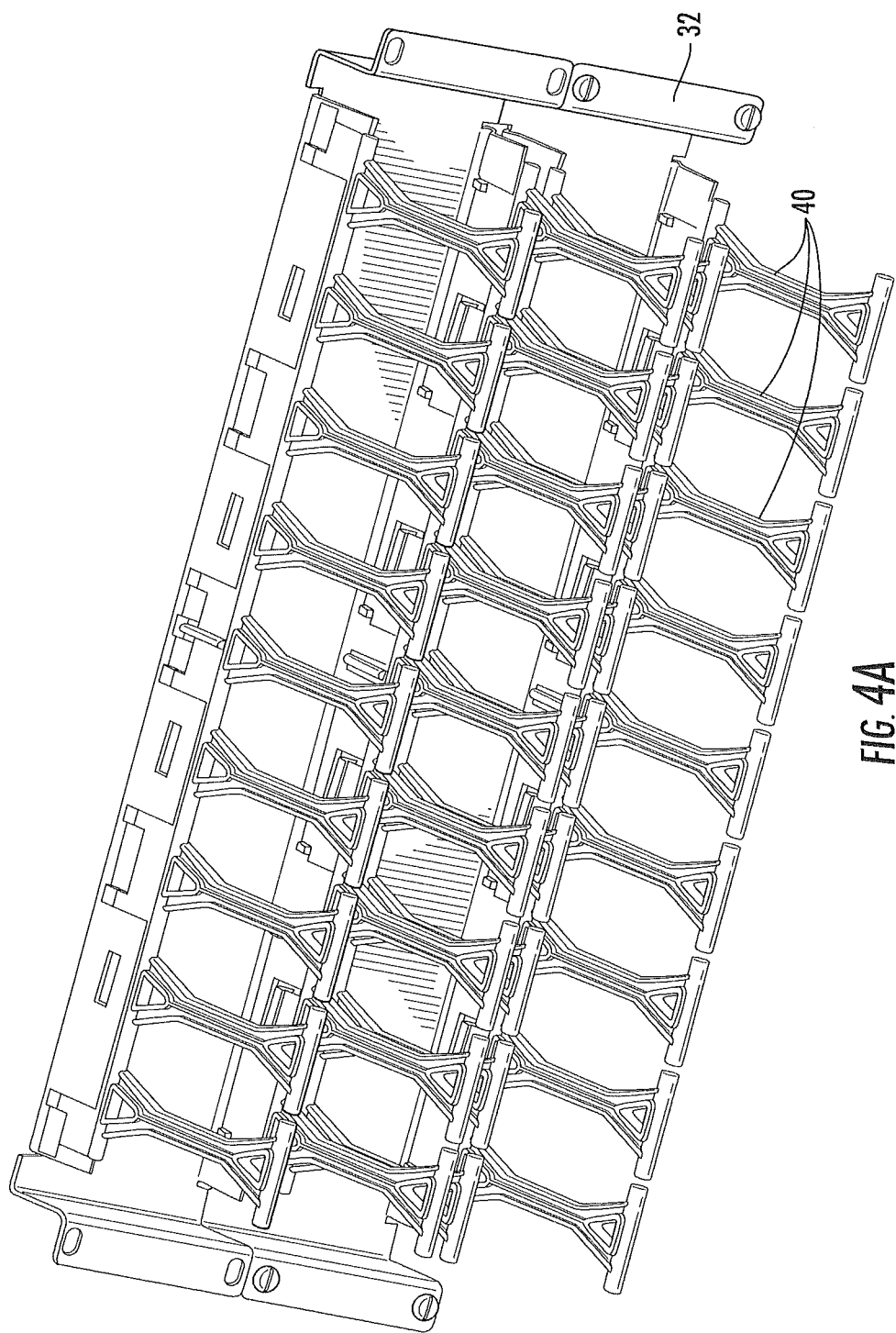
FIG. 4A is a perspective view of the director of FIG. 1 with horizontal cable management fingers.
Figure 5:
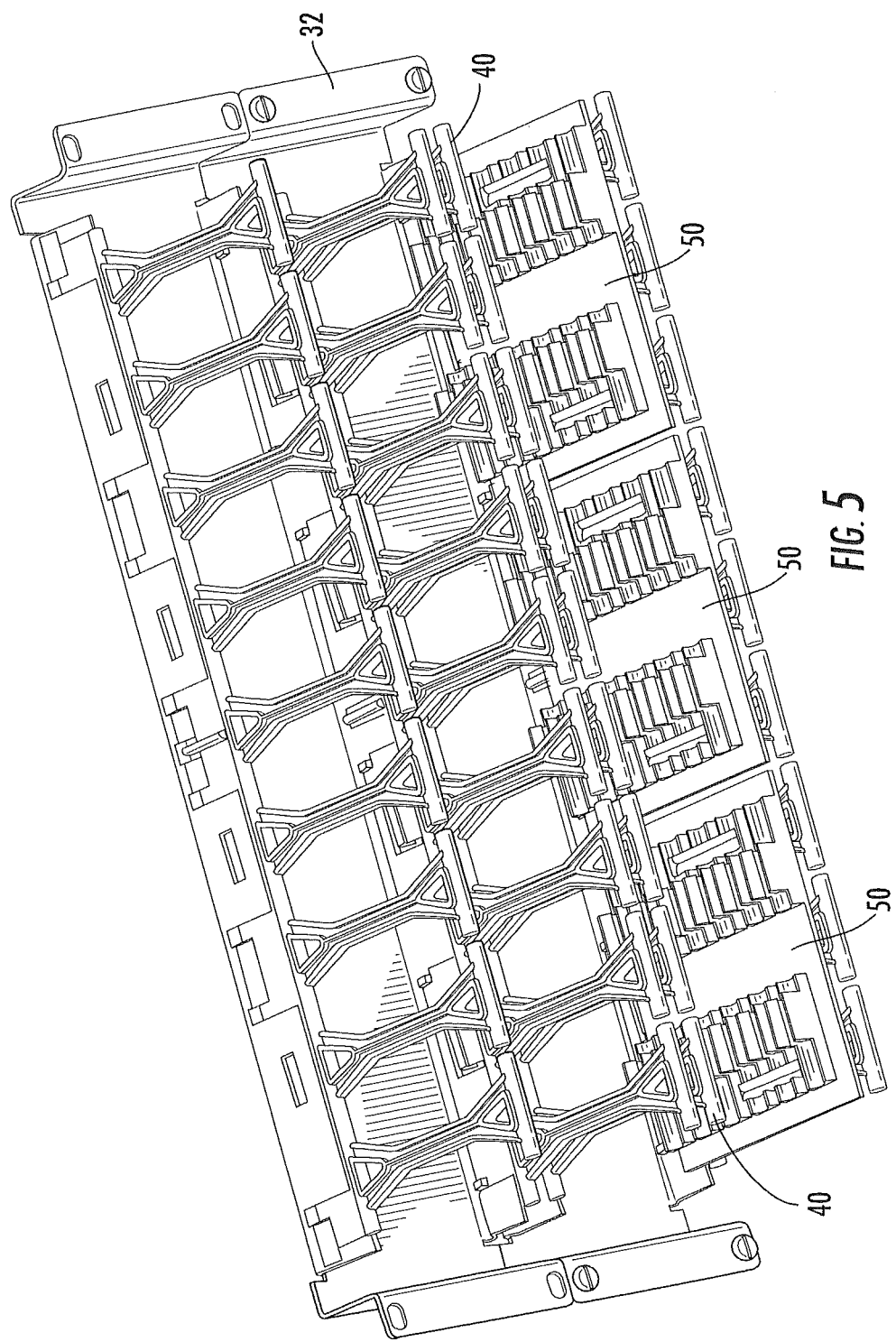
FIG. 5 is an enlarged perspective view of the cable management fingers of FIG. 4A with three cable transition management manifolds according to embodiments of the present invention.
Figure 6:
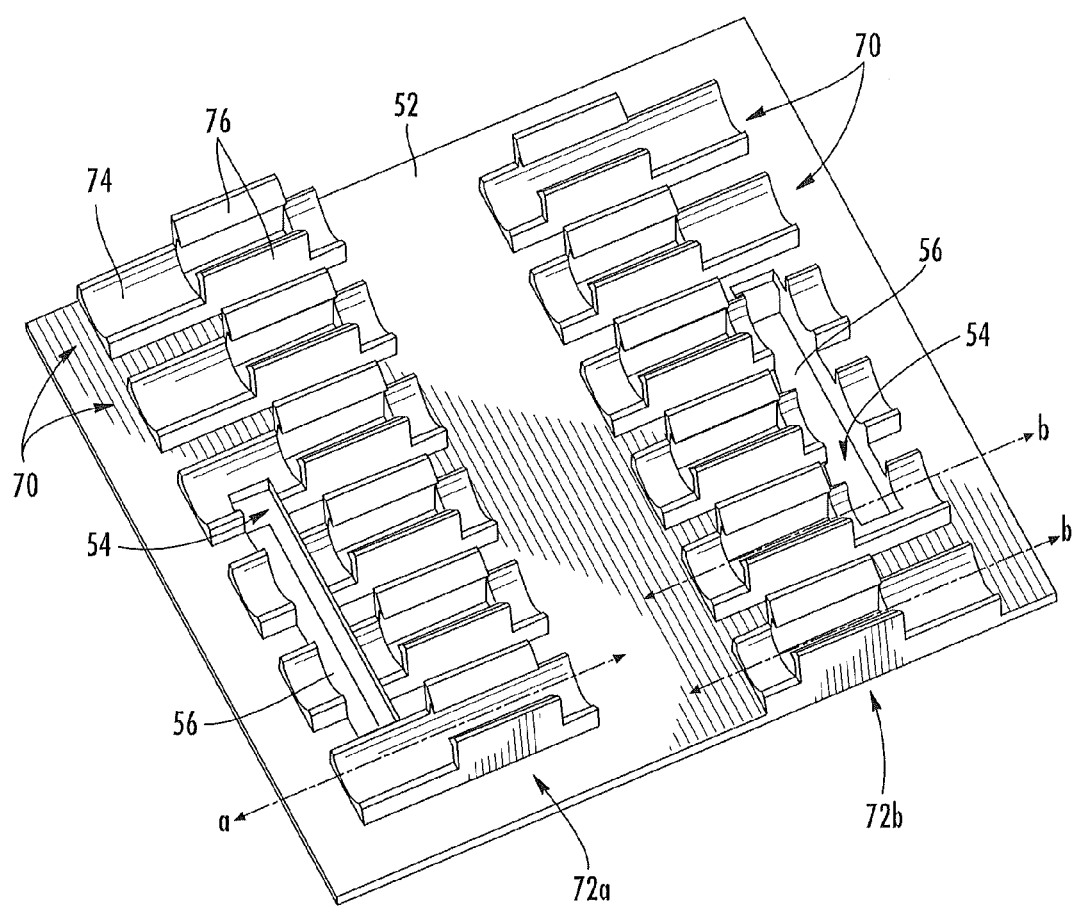
FIG. 6 is a greatly enlarged top perspective view of one of the cable transition management manifolds of FIG. 5.
Figure 7:
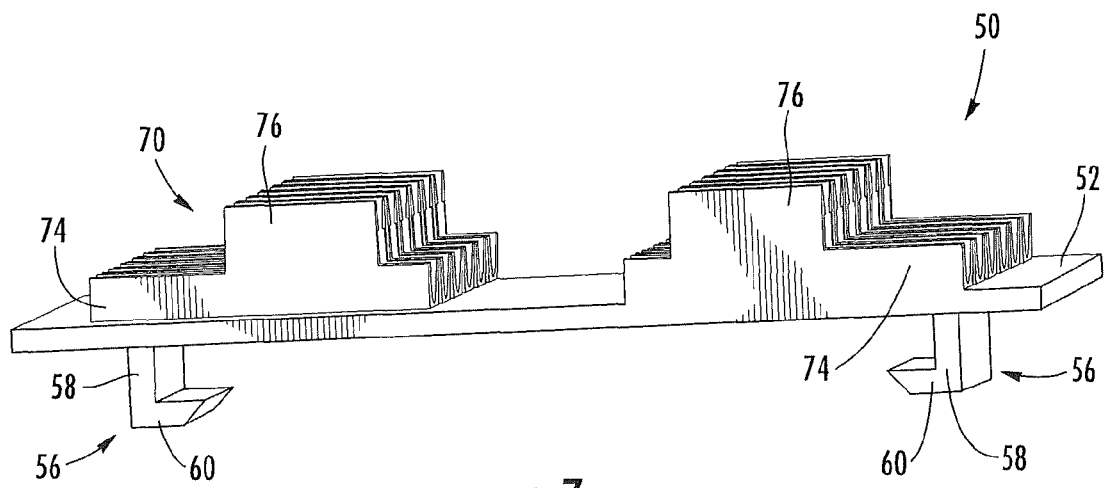
FIG. 7 is a greatly enlarged front perspective view of the cable transition management manifold of FIG. 6.
Figure 8:
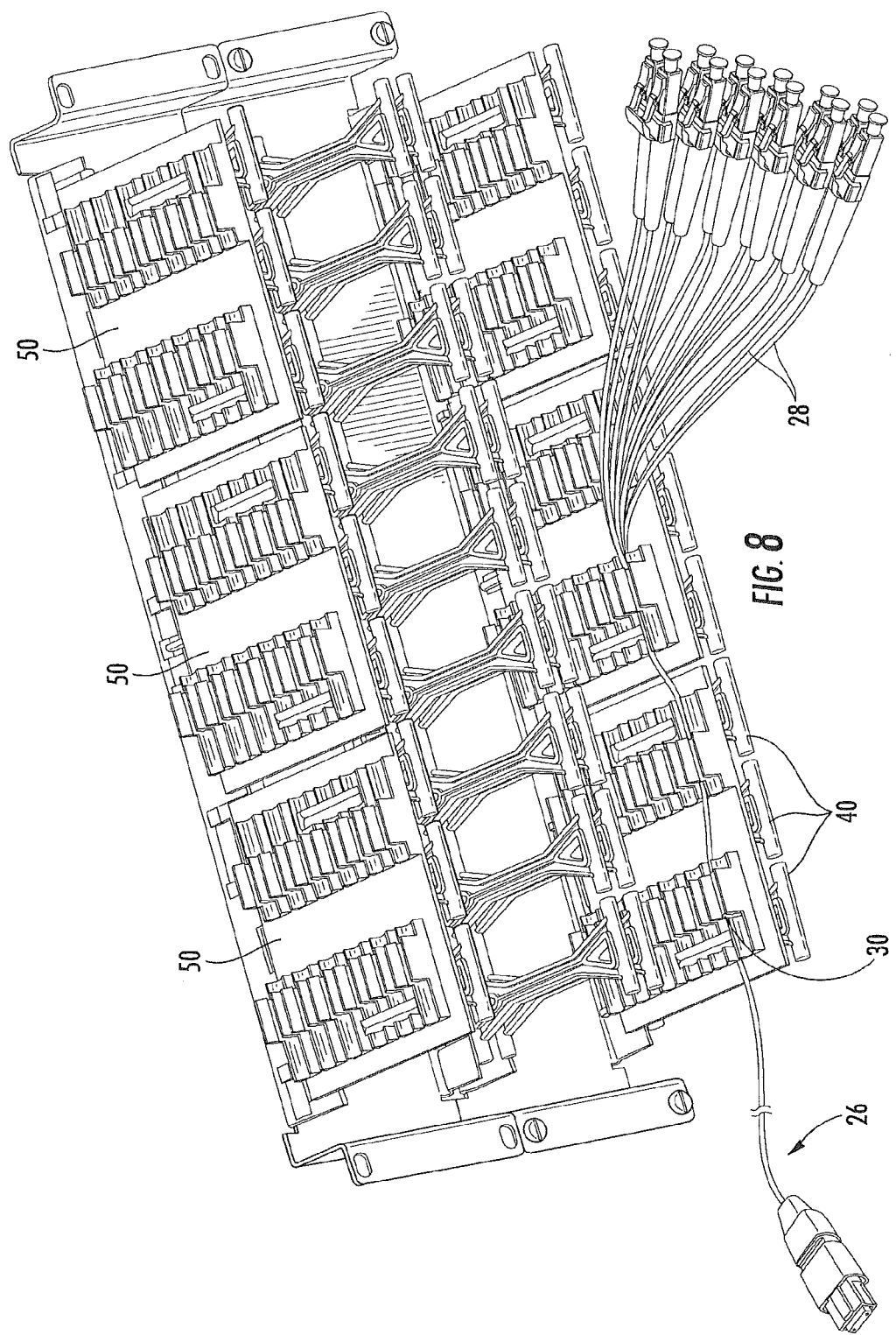
FIG. 8 is a perspective view of the cable management fingers of FIG. 5 with additional cable transition management manifolds in place.

Referring now to FIG. 5, the planar arrays of cable management fingers 40 illustrated in FIG. 4A can be enhanced with a plurality of cable transition management manifolds, each designated broadly in FIG. 5 at 50. As shown in FIGS. 6 and 7, the manifold 50 includes a main panel 52 that may be substantially flat. Two elongated apertures 54 are present in the main panel 52. A snap latch 56 having a shaft 58 and a hook 60 depends from the main panel 52 below each of the apertures 54. The snap latches 56 are sized and configured to secure the manifold 50 to two cable management fingers 40 as shown in FIGS. 5 and 8. Typically, the snap latches 56 are about 0.25 to 0.5 inches in height and are separated from each other by about 1.75 and 2.50 inches; however, those of skill in this art will recognize that these dimensions may vary depending on the arrangement of the cable management fingers 40. It will also be recognized that other snap latches or other interconnection mechanisms may be used to secure the manifold 50 to the cable management fingers 40.

Still referring to FIGS. 6 and 7, the cable transition management manifold 50 also includes a plurality of clip channels 70. Each of the clip channels 70 includes a generally semi-cylindrical channel portion 74 and a pair of opposed clip arms 76 that rise from each edge of the channel portion 74. The channel portion 74 is dimensioned to receive a transition of a fiber optic cable (a width of between about 0.25 and 0.5 inches is typical). The clip arms 76 have overhanging hooks that are configured to maintain a fiber optic cable transition in place in the clip channel 70. A transition 80 of a cable 26 is shown clipped into a clip channel 70 in FIG. 8.

In the illustrated embodiment, the clip channels 70 are arranged on the main panel 52 in two rows 72a, 72b of six clip channels 70 each. Notably, the clip channels 70 of the row 72a are staggered relative to the clip channels of the row 72b, such that the axis a of any one channel portion 74 of the row 72a is offset from the axes of the channel portions 74 of the clip channels 70 of the opposite row 72b and vice versa. This arrangement provides flexibility in routing cables in and around the manifolds 50.

The cable transition management manifolds 50 may be formed of any suitable material, but are typically formed of a polymeric material, such as polycarbonate, or a copolymer, blend or mixture thereof, such as polycarbonate and acrylonitrile butadiene styrene (ABS). Polymeric cable transition management manifolds 70 are typically formed via injection molding.

Figure 9:
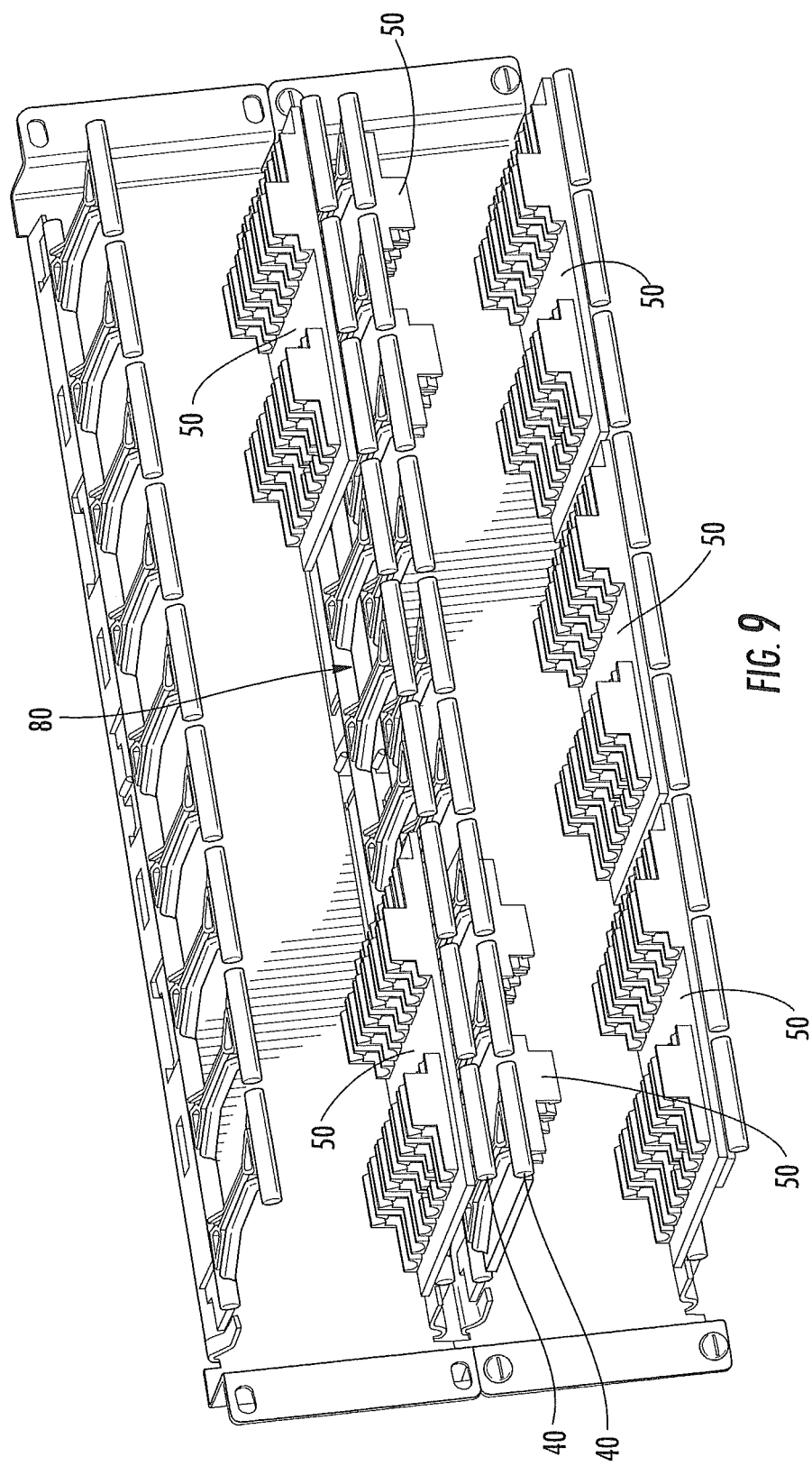
FIG. 9 is a perspective view of the cable management fingers of FIG. 5 showing that cable transition management manifolds can be attached to the top and/or bottom of the cable management fingers.

As can be seen in FIG. 5, multiple cable transition management manifolds 50 can be secured to the cable management fingers 40 present on a director 20. In the illustrated embodiment, each of the cable transition management manifolds 50 spans three cable management fingers 40, but this number may vary depending on the configuration of the manifold 50 and the fingers 40. FIG. 9 illustrates that the cable transition management manifolds 50 may be attached above or below a row of cable management fingers 40 as needed or desired. In either instance, each of the manifolds 50 is positioned to receive, secure and maintain organization of twelve fiber optic cable transitions 30. Thus, as an example, the arrangement illustrated in FIG. 9, which has seven manifolds 50, can accommodate 84 fiber optic cable transitions 30 (representing 84 fiber optic cables), which is sufficient for most cable directors 20. It can also be seen that, in the illustrated arrangement, cables may be routed to and from the manifolds 50 on both the top and bottom rows of fingers 40 through the space 80 formed between the manifolds 50 attached to the top row of fingers 40.

Figure 10:
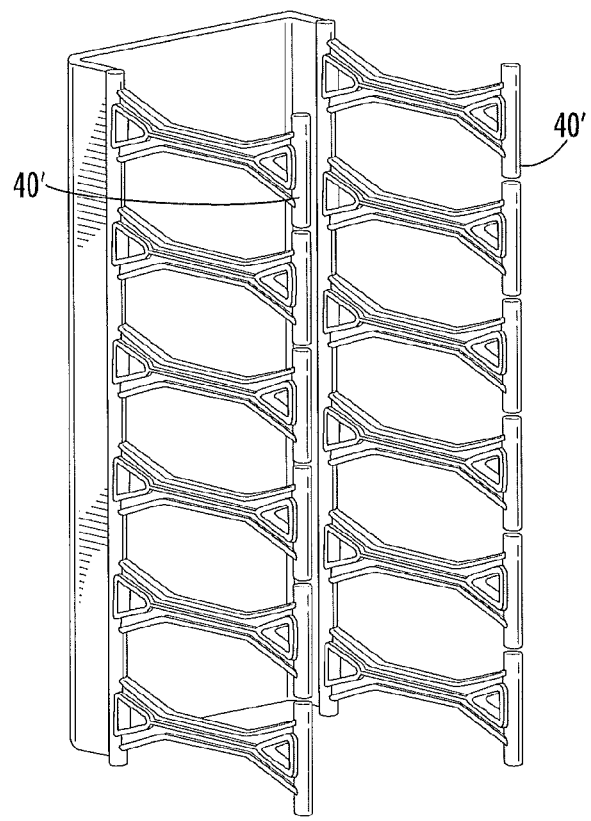
FIG. 10 is a perspective view of vertically-oriented cable management fingers for a director of FIG. 1.
Figure 11:
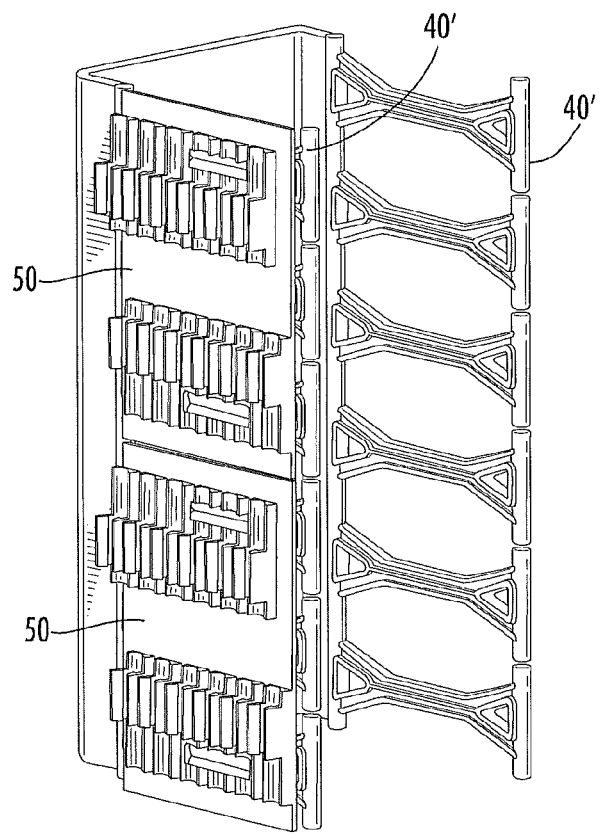
FIG. 11 is a perspective view of the cable management fingers of FIG. 10 with a cable transition management manifold in place.

Referring now to FIGS. 10 and 11, cable management fingers 40' are shown mounted to a cable director or other communications structure (not shown) in a vertical arrangement. FIG. 11 shows that the cable transition management manifolds can be attached to the fingers 40' in a vertical orientation and still provide management of cable transitions.

Those skilled in this art will appreciate that the manifolds 50 may take other configurations. For example, mounting features other than snap clips, such as hooks, screws, or the like, may be used to attach the manifold 50 to the mounting fingers 40, depending on the actual configuration of the mounting fingers 40. Also, the clip channels 70 may take different configurations, with the clip arms 76 being smaller or larger, or even present as only a single clip arm, or the channel portion 74 being less defined or even absent. More or fewer clip channels 70 may be present in the manifold 50. Other modifications to the manifold may also be recognizable to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A datacommunications system, comprising:
a mounting frame;
cable management fingers arranged in one or more planar arrays;
a cable transition management manifold attached to the cable management fingers, the cable transition management manifold comprising:
a main panel;
mounting features attached to the main panel to mount the manifold onto the cable management fingers; and
clips mounted to the main panel configured to receive and secure a fiber optic cable transition; and
a fiber optic cable having a plurality of optical fibers and a transition wherein the optical fibers are broken out from each other;
wherein the transition of the fiber optic cable is mounted in one of the clips on the cable transition management manifold.

2. The structure defined in claim 1, wherein the clips are part of clip channels.

3. The structure defined in claim 2, wherein the clip channels are arranged in two substantially parallel rows on the main panel.

4. The structure defined in claim 1, wherein the mounting features comprise snap latches.

5. The structure defined in claim 1, wherein the cable management fingers are horizontally oriented.

6. The structure defined in claim 1, wherein the cable management fingers are vertically oriented.

* * * * *